United States Patent [19]
Blake

[11] Patent Number: 5,869,915
[45] Date of Patent: *Feb. 9, 1999

[54] ELECTRIC MOTOR FOR AN X-RAY TUBE

[75] Inventor: James A. Blake, Franklin, Wis.

[73] Assignee: General Electric Company, Milwaukee, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 718,893

[22] Filed: Sep. 24, 1996

[51] Int. Cl.$^6$ .............................. H02K 1/00; H02K 19/26
[52] U.S. Cl. ..................... 310/182; 310/166; 310/211; 310/212; 310/261; 310/267
[58] Field of Search ................................. 310/166, 182, 310/211, 212; 29/596, 597, 598

[56] References Cited

U.S. PATENT DOCUMENTS

| | | | |
|---|---|---|---|
| 3,597,646 | 8/1971 | Lawrenson | 310/166 |
| 3,685,142 | 8/1972 | Deming | 29/598 |
| 4,309,635 | 1/1982 | Sei et al. | 310/211 |
| 5,422,527 | 6/1995 | Lazzaro | 310/211 |
| 5,565,752 | 10/1996 | Jansen et al. | 318/807 |

FOREIGN PATENT DOCUMENTS

| | | | |
|---|---|---|---|
| 0628588 | 10/1978 | U.S.S.R. | 310/211 |
| 1638765A | 3/1991 | U.S.S.R. | 310/211 |

*Primary Examiner*—Thomas M. Dougherty
*Assistant Examiner*—Elvin G. Enad
*Attorney, Agent, or Firm*—John S. Beulick; Christian G. Cabou; Phyllis Y. Price

[57] ABSTRACT

An electric motor for an x-ray tube of a medical imaging system is described herein. The electric motor includes a stator and a substantially cylindrical rotor. The stator includes stator winding slots and stator windings injected into the stator winding slots. The stator also has a stator bore. The rotor is rotatably mounted within a stator bore so that the rotor is coaxial with the stator bore. The rotor includes a rotor core, a plurality of rotor bars, and end rings. The rotor bars are at located in rotor bar openings at a periphery of the rotor. At least one of the rotor bars has a different cross-sectional area than one of the other rotor bars.

19 Claims, 6 Drawing Sheets

ELECTRIC MOTOR FOR AN X-RAY TUBE

FIELD OF THE INVENTION

This invention relates generally to medical imaging and more particularly, to an electric motor for controlling target rotation speed of an x-ray source in medical imaging systems.

BACKGROUND OF THE INVENTION

In at least one known medical imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient, and after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile. Such a medical imaging system typically is referred to as a computed tomography (CT) system.

In known third generation CT systems, the x-ray source and the detector array are located on a rotatable gantry. The gantry rotates around the object to be imaged so that the angle at which the x-ray beam intersects the object constantly changes. A group of x-ray attenuation measurements, i.e., projection data, from the detector array at one gantry angle are referred to as a "view". A "scan" of the object comprises a set of views made at different gantry angles during one revolution of the x-ray source and detector. In an axial scan, projection data are processed to construct an image that corresponds to a two dimensional slice taken through the object. One method for reconstructing an image from a set of projection data is referred to in the art as the filtered back projection technique. This process converts that attenuation measurements from a scan into integers called "CT numbers" or "Hounsfield units", which are used to control the brightness of a corresponding pixel on a cathode ray tube display.

The x-ray source, sometimes referred to as an x-ray tube, typically includes an evacuated glass x-ray envelope containing a cathode and a rotating anode. An induction motor rotates the anode, or target, at a target speed in a well known manner. X-rays are produced by applying a high voltage across the anode and cathode and accelerating electrons from the cathode against a focal spot on the anode. The x-rays produced by the x-ray tube diverge from the focal spot in a generally conical pattern.

Induction motors are well known and include a stator and a rotor. The stator includes current carrying windings which generate a magnetic field. The rotor is rotatably coupled to the stator, and typically includes a rotor core formed by a plurality of laminations. Rotor bars, or conducting bars, extend through the rotor core and are arranged axially at the outer periphery of the rotor core. A rotor shaft is mounted to the rotor core and extends from the core. One end of the rotor shaft is coupled to the anode so that the anode rotates with the rotor shaft. The rotor shaft axis, of course, is coaxial with the rotor core axis of rotation.

In operation, a supply source impresses an alternating voltage on the stator windings to induce an alternating current in the stator windings. The induced current generates an alternating magnetic field which induces currents in the rotor bars of the rotor. Current flow through the rotor bars results in the generation of magnetic fields. As is well known, the magnetic fields generated by the stator windings and the rotor bars couple and create a torque which causes the rotor to rotate. The stator and rotor operate as a rotating transformer with a secondary (rotor) whose secondary impedance is determined by the cross-sectional area of the rotor bars. The magnitude of the current in the stator windings is affected by the rotor impedance.

In the above described induction motor, the rotor rotates at a speed less than synchronous speed. For example, in a six pole induction motor, the synchronous speed (for sixty hertz operation) is 1200 rpm. The rotor may, however, have an actual speed of 1100 rpm. Such a condition is known as "slip." Factors affecting slip of the rotor include bearing friction, rotor unbalance and target mass.

In a CT system, the rotational speed of the anode preferably is precisely controlled so that an operator can prevent the anode from overheating. If the anode overheats, a scan may have to be interrupted to allow the anode to cool. Interrupting a scan, of course, is highly undesirable. Overheating of the anode can also result in degradation of image quality.

Although controlling the speed of the anode is important, it is difficult to accurately monitor the anode speed due to the high voltage applied across the anode, and the anode rotation within a vacuum. Furthermore, rotor slip inhibits accurate monitoring of anode rotation speed. Specifically, the conditions affecting rotor slip can change while performing a scan, thus causing the rotor and anode speed to change. These changes are difficult to detect and monitor.

It would be desirable to control target rotation speed to avoid overheating the anode and to facilitate providing high quality images. It also would be desirable to provide such control without significantly increasing the cost of the system.

SUMMARY OF THE INVENTION

These and other objects may be attained in an induction motor which, in one embodiment, includes a rotor having a plurality of rotor bars with varying cross-sectional areas. In the one embodiment, the rotor is substantially cylindrical, and includes a first end, a second end, and a plurality of rotor bars extending from the first end to the second end at a periphery of the rotor. Each rotor bar has a first end and a second end, and a respective cross-sectional area. The cross-sectional areas of the rotor bars are selected, and vary, so that the current in the stator windings varies, as described below. Each rotor bar first end is adjacent the rotor first end, and each rotor bar second end is adjacent the rotor second end. The rotor also includes two shorting rings. One shorting ring electrically connects the rotor bar first ends, and the other shorting ring electrically connects the rotor bar second ends.

The motor also includes a stator including a first end, a second end, and a substantially cylindrical stator bore extending from the first end to the second end. In addition, the stator includes a plurality of stator winding slots at a periphery of the stator bore, and stator windings are injected into the stator winding slots. The power source is connected to the stator windings.

When the stator windings are energized, the stator windings generate an alternating magnetic field which induces currents in the rotor bars. The currents flowing through the rotor bars result in generation of magnetic fields, and the respective stator and rotor bar magnetic fields couple and generate a torque. The rotor begins to rotate when the respective fields couple. As the rotor rotates, and due to the varying cross-sectional area rotor bars, the rotor impedance as measured at a selected location on the stator also varies. The varying impedance results in varying the load current in the stator windings, and the varying load current is monitored and used to determine the rotor slip frequency. Once the slip frequency is known, the rotor speed can be readily determined. The determined rotor speed can then be compared to a desired speed, and based on this comparison, the source voltage can be adjusted, if necessary, so that the motor speed substantially equals the desired speed.

The above described induction motor enables precise control of target rotation speed. In addition, the induction motor utilizing a plurality of rotor bars with varying cross-sectional areas does not significantly increase the cost of the CT system.

DETAILED DESCRIPTION OF THE DRAWINGS

Figure 1:
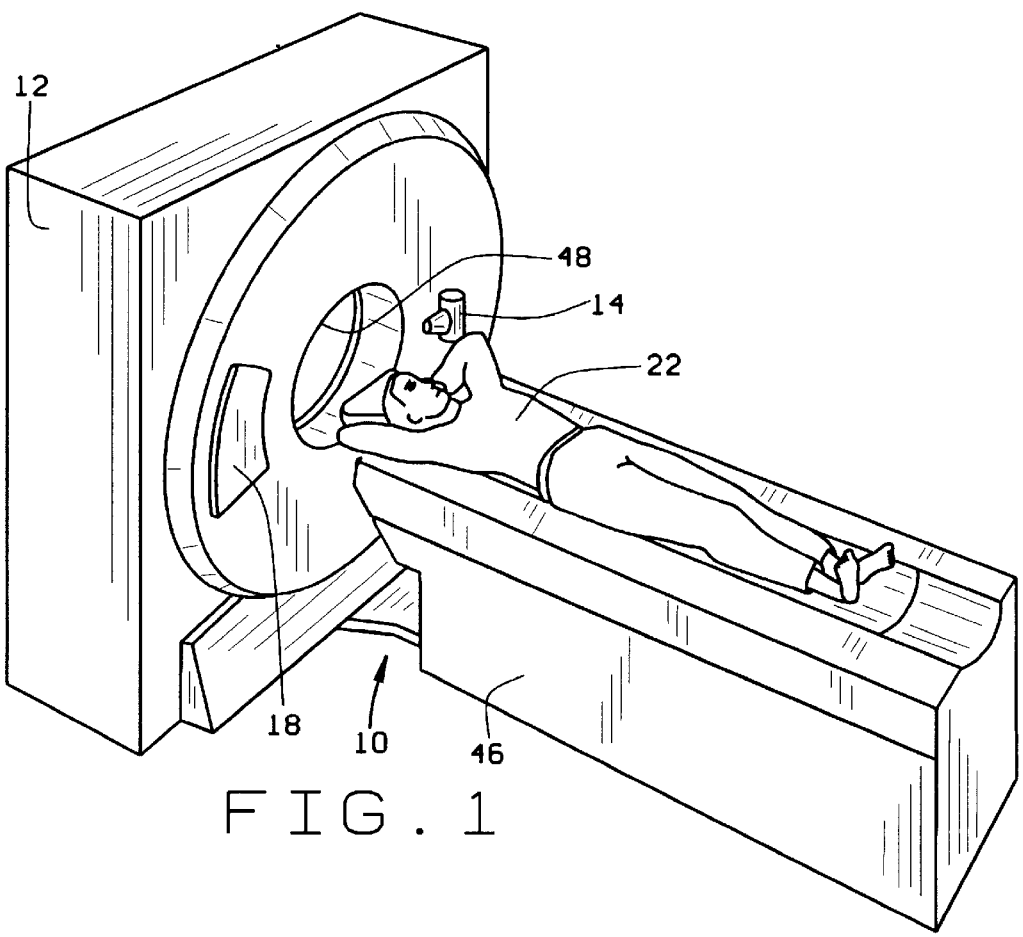
FIG. 1 is a pictorial view of a CT imaging system.
Figure 2:
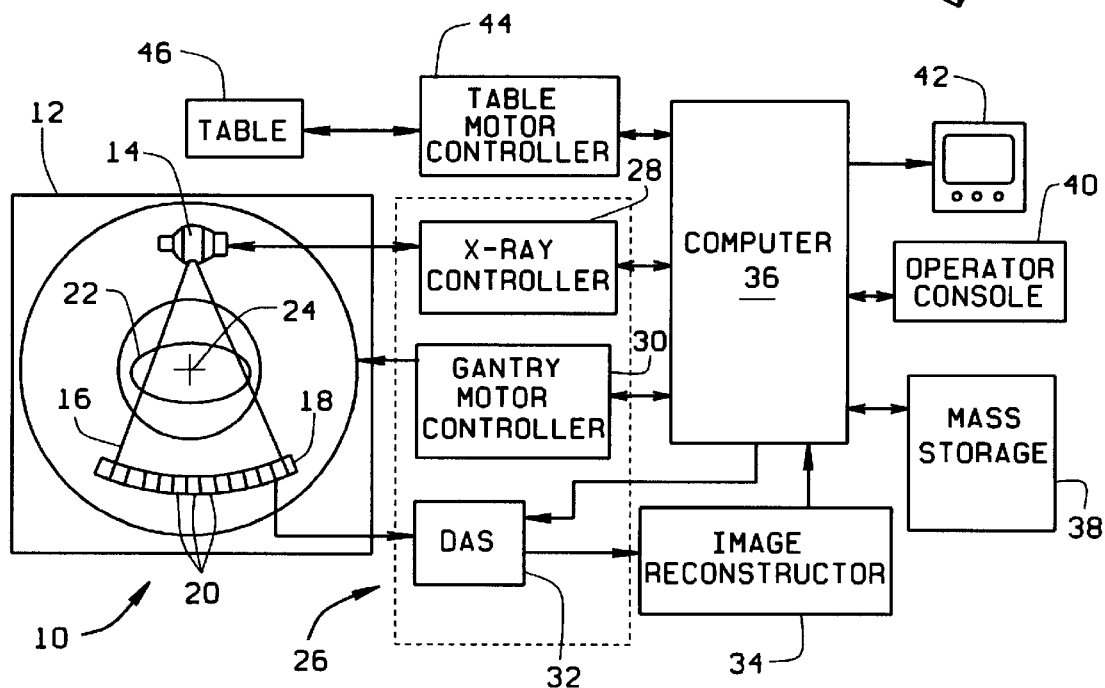
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a fan beam of x-rays 16 toward a detector array 18 on the opposite side of gantry 12. Detector array 18 is formed by detector elements 20, or channels, which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
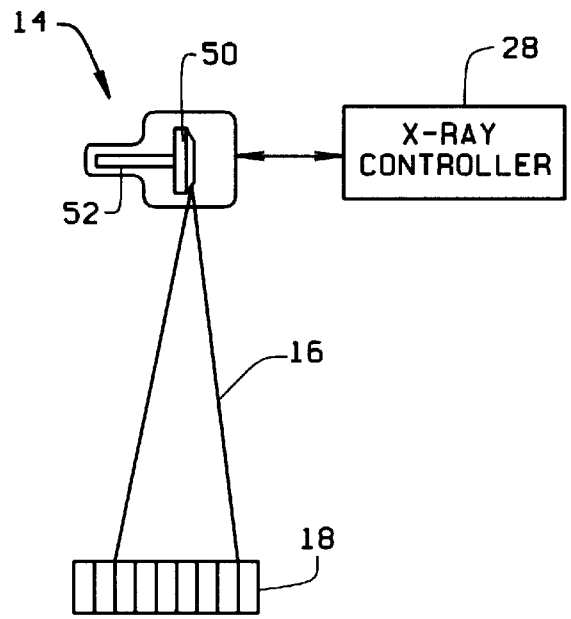
FIG. 3 is a schematic representation of an x-ray source and x-ray detector of FIG. 1.

FIG. 3 is a schematic representation of x-ray source 14 and x-ray detector 18. As shown, x-ray source 14 includes an anode 50 and a rotating shaft 52. Rotating shaft 52 is mounted to a rotor shaft of an induction motor (not shown in FIG. 3). X-ray controller 28 provides control signals to the induction motor to control rotation of rotating shaft 52.

Figure 4:
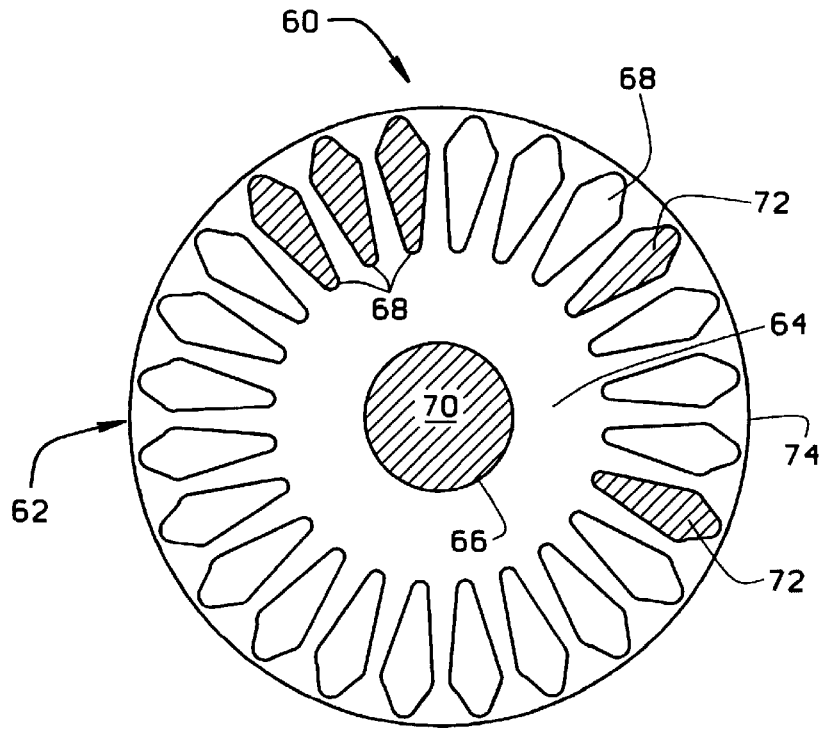
FIG. 4 is a plan end view of a motor rotor with the end ring cut away.

FIG. 4 is a plan end view of a known motor rotor 60 with the end ring cut away. Rotor 60 includes a rotor core 62 formed by a plurality of identical laminations 64. Rotor core 62, alternatively, can be formed from a one-piece steel stock. Outermost lamination 64 forming a part of rotor core 62 is shown in FIG. 4. Laminations 64 include a rotor shaft opening 66 and a plurality of secondary rotor bar openings 68. A rotor shaft 70 is mounted to the rotor core so that the axis of shaft 70 is coaxial with the rotor axis of rotation and extends from rotor shaft opening 66. As described above, rotor shaft 70 typically is coupled to anode shaft 52 of x-ray source 14 (FIG. 3). Secondary rotor bars 72 are cast in rotor bar openings 68, and rotor bars 72 are positioned axially with respect to rotor shaft 70 and are radially offset from an outer periphery 74 of core 62.

Figure 5:
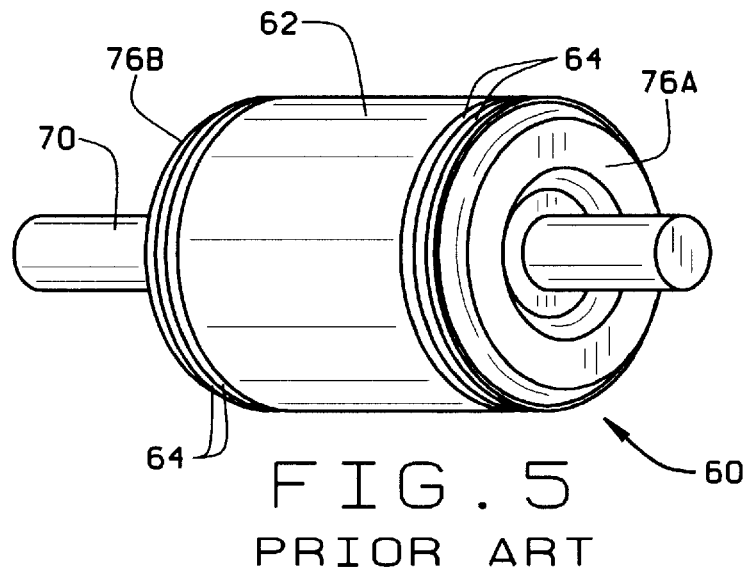
FIG. 5 is a perspective view of the motor rotor of FIG. 4.

A perspective view of rotor 60 is shown in FIG. 5. First and second end rings 76A and 76B, formed at opposite ends of rotor 60 are shown. End rings 76A and 76B short respective first and second ends of rotor bars 72. Rotor shaft 70 extends through rotor core 62, and one end of rotor shaft 70 is coupled to anode shaft 52 of x-ray source 14 (not shown in FIG. 5).

In operation, and at motor start-up, a power source energizes the stator windings and generates an alternating current, also referred to herein as a load current, in the stator windings. The alternating magnetic field generated by the stator windings induces currents in rotor bars 72 of motor rotor 60. Magnetic fields therefore are generated by rotor bars 72, and the rotor bar magnetic fields couple with the magnetic field of the stator windings, and rotor 60 begins to rotate. However, as described above, rotor shaft 70 does not rotate at a synchronous speed. Rather, rotor shaft 70 rotates at a speed less than synchronous speed. The difference between synchronous speed and actual rotor shaft rotation speed is referred to herein as slip. Although it is highly desirable to monitor and control the rotor speed, accurate monitoring and control is difficult due to slip.

In accordance with one embodiment of the present invention, a rotor includes rotor bars having varying cross-sectional areas. The rotor therefore has a varying impedance which alters the load current in the stator windings. The varying load current is readily and easily measured using, for example, an ammeter. Once the varying load current is known, the rotor slip frequency can be determined. Using the slip frequency, the rotor speed can be determined. Such an arrangement enable accurate monitoring and control of the rotor speed.

Figure 6:
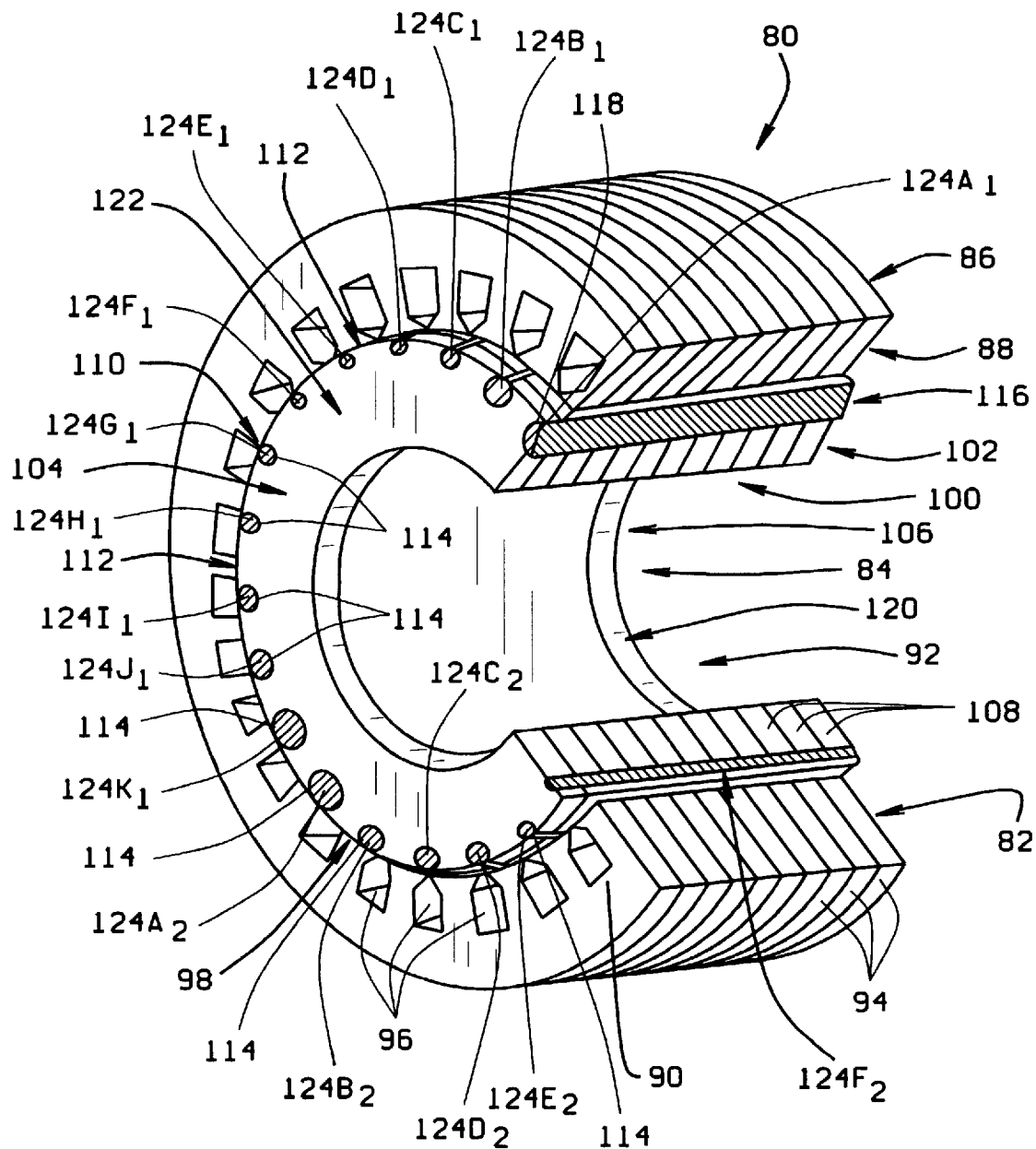
FIG. 6 is a partial perspective cross-section view of a stator and a rotor in accordance with one embodiment of the present invention.

FIG. 6 illustrates a partial perspective cross-section view of a motor 80 in accordance with one embodiment of the present invention. Specifically, motor 80 includes a stator 82 and a rotor 84. Stator 82 includes a stator core 86 and stator windings (not shown). Stator core 86 has a first end 88, a second end 90, and a substantially cylindrical stator bore 92 extending from stator first end 88 to stator second end 90. Stator core 86 is formed by a plurality of identical stator laminations 94. Each stator lamination 94 includes a plurality of stator winding slots 96 at a periphery 98 of stator bore 92. Stator windings (not shown) are injected into stator winding slots 96, and the stator windings form a selected number of poles, e.g., two poles, four poles, or six poles.

Rotor 84, as shown, is substantially cylindrical and is mounted within stator bore 92, e.g., using a cantilever structure or bearings mounted in endshields, as is well known, so that rotor 84 is coaxial with stator bore 92. Particularly, rotor 84 is mounted rotatably within stator bore 92 so that rotor 84 may rotate relative to stator 82. Rotor 84, alternatively, may be mounted within stator bore 92 so that stator 82 rotates relative to rotor 84. Rotor 84 includes a rotor core 100 having a first end 102, a second end 104, and a rotor shaft bore 106 extending from rotor first end 102 to rotor second end 104. Rotor core 100 is formed by a plurality of identical rotor laminations 108. Rotor core 100, alternatively, can be formed from a one-piece steel stock. Rotor shaft bore 106 is configured to coaxially receive therein a rotor shaft (not shown). Rotor core 100 further includes a plurality of rotor bar openings 110 at an outer periphery 112 of rotor core 100. As shown, a plurality of rotor bars 114 are located, i.e., cast, within respective rotor bar openings 110. Each rotor bar 114 has a first end 116 and a second end 118, and extends from rotor first end 102 to rotor second end 104. Each rotor bar 114 has a cross-sectional area. However, as described below, not all rotor bars 114 have the same cross-sectional area.

Rotor 84 also includes first and second shorting rings 120 and 122, respectively. First shorting ring 120 electrically connects respective rotor bar first ends 116. Similarly, second shorting ring 122 electrically connects respective rotor bar second ends 118.

Rotor bars 114 are arranged in a plurality of rotor bar pairs ($124A_1$, $124A_2$), ($124B_1$, $124B_2$), ($124C_1$, $124C_2$), ($124D_1$, $124D_2$), ($124E_1$, $124E_2$), ($124F_1$, $124F_2$), ($124G_1$, $124G_2$), ($124H_1$, $124H_2$), ($124I_1$) $124I_2$), ($124J_1$, $124J_2$), ($124K_1$, $124K_2$). The two rotor bars in each respective rotor bar pair have a substantially similar cross-sectional area, and are positioned 180 degrees apart from each other. For example, and with respect to rotor bar pair ($124A_1$, $124A_2$), rotor bars $124A_1$ and $124A_2$ have a substantially similar cross-sectional area and are positioned 180 degrees apart from each other at rotor outer periphery 112. Similarly, rotor bars $124B_1$ and $124B_2$ of rotor bar pair ($124B_1$, $124B_2$) have a substantially similar cross-sectional area and are positioned 180 degrees apart from each other at rotor outer periphery 112. However, the substantially similar cross-sectional area of rotor bars $124B_1$ and $124B_2$ is different from the substantially similar cross-sectional area of rotor bars $124A_1$, and $124A_2$.

Rotor bars $124A_1$, and $124A_2$ have the largest cross-sectional area and rotor bars $124F_1$ and $124F_2$ have the smallest cross-sectional area. Furthermore, rotor bar pair ($124A_1$, $124A_2$) and rotor bar pair ($124F_1$, $124F_2$) are oriented so that a plane (not shown) containing rotor bars $124A_1$, and $124A_2$ is substantially perpendicular to a plane (not shown) containing rotor bars $124F_1$ and $124F_2$. Therefore, largest cross-sectional rotor bars $124A_1$ and $124A_2$ are oriented 90 degrees apart from smallest cross-sectional bars $124F_1$ and $124F_2$, i.e., at right angles, at rotor outer periphery 112.

The rotor bars in rotor bar pairs ($124B_1$, $124B_22$), ($124C_1$, $124C_2$), ($124D_1$, $124D_2$), ($124E_1$, $124E_2$), ($124G_1$, $124G_2$), ($124H_1$, $124H_2$), ($124I_1$, $124I_2$), ($124J_1$, $124J_2$), ($124K_1$, $124K_2$) have cross-sectional areas larger than the cross-sectional area of rotor bars $124F_1$ and $124F_2$, and cross-sectional areas smaller than the cross-sectional area of rotor bars $124A_1$ and $124A_2$. In addition, each rotor bar of respective rotor bar pair ($124B_1$, $124B_2$), ($124C_1$, $124C_2$), ($124D_1$, $124D_2$), ($124E_1$, $124E_2$), ($124G_1$, $124G_2$), ($124H_1$, $124H_2$), ($124I_1$, $124I_2$), ($124J_1$, $124J_2$), ($124K_1$, $124K_2$) is positioned between respective largest cross-sectional area rotor bars $124A_1$ and $124A_2$ and smallest cross-sectional area rotor bars $124F_1$ and $124F_2$ on rotor outer periphery 112.

In operation, a voltage at a known frequency is impressed on the stator windings to energize the stator windings and generate a stator current, $I_{STATOR}$, in the stator windings. Stator current, $I_{STATOR}$, generates a magnetic field in the stator windings, which field induces a rotor current, $I_{ROTOR}$, in rotor bars 114. As a result of the induced rotor current, $I_{ROTOR}$, in rotor bars 114, magnetic fields are generated, and the rotor bar magnetic fields couple with the stator magnetic fields to create a torque. The rotor core 100 begins to rotate when the respective magnetic fields couple.

Figure 7:
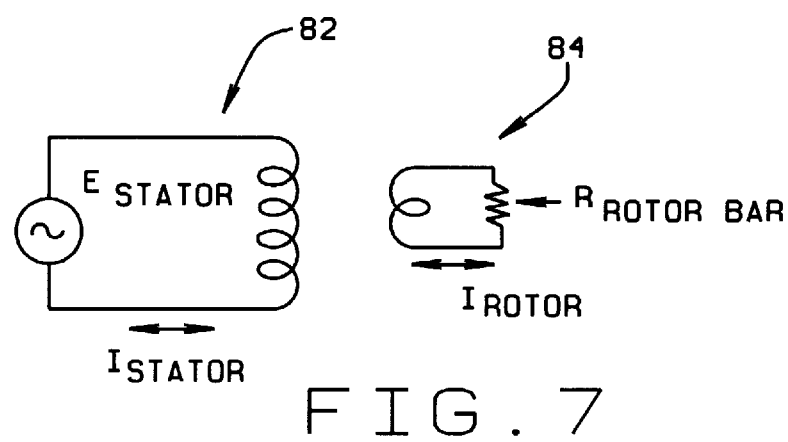
FIG. 7 is a circuit schematic diagram of an electrical circuit for the stator and rotor of FIG. 6.

FIG. 7 is a schematic diagram of an equivalent electrical circuit for stator 82 and rotor 84. As shown, stator 82 is energized with a voltage at a known frequency, $E_{STATOR}$, and both stator current, $I_{STATOR}$, and rotor current, $I_{ROTOR}$, are proportional to a rotor bar resistance, $R_{ROTOR\ BAR}$. Similarly, stator current, $I_{STATOR}$ is proportional to rotor current, $I_{ROTOR}$. Rotor bar resistance, $R_{ROTOR\ BAR}$, in turn, is proportional to the cross-sectional areas of respective rotor bars 114. Particularly, largest cross-sectional rotor bars $124A_1$ and $124A_2$ have a least rotor bar resistance, while smallest cross-sectional rotor bars $124F_1$ and $124F_2$ have a greatest rotor bar resistance.

As rotor 84 rotates, and due to the different impedances of rotor bar pairs ($124A_1$, $124A_2$), ($124B_1$, $124B_2$), ($124C_1$, $124C_2$), ($124D_1$, $124D_2$), ($124E_1$, $124E_2$), ($124F_1$, $124F_2$), ($124G_1$, $124G_2$), ($124H_1$, $124H_2$), ($124I_1$, $124I_2$), ($124J_1$, $124J_2$), ($124K_1$, $124K_2$), the load current, i.e., $I_{STATOR}$, in the stator windings. The varying impedance also changes available torque produced by each pair ($124A_1$, $124A_2$), ($124B_1$, $124B_2$), ($124C_1$, $124C_2$), ($124D_1$, $124D_2$), ($124E_1$, $124E_2$), ($124F_1$, $124F_2$), ($124G_1$, $124G_2$), ($124H_1$, $124H_2$), ($124I_1$, $124I_2$), ($124J_1$, $124J_2$), ($124K_1$, $124K_2$) of rotor bars 114. However, a rotating target inertia smooths this pulsing, or changing, torque to provide a uniform target rotating speed.

Figure 8:
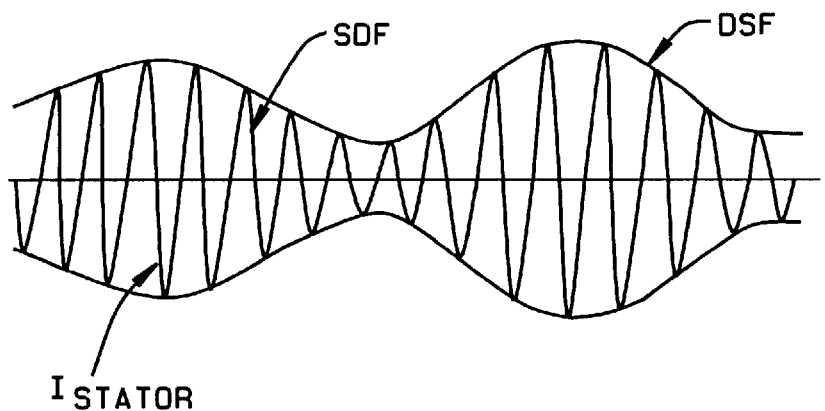
FIG. 8 illustrates a stator current waveform generated during operation of the stator and rotor of FIG. 6.

FIG. 8 illustrates a stator current waveform generated while stator 82 is energized with a stator drive frequency, SDF. Different cross-sectional area rotor bar pairs ($124A_1$, $124A_2$)-($124K_1$, $124K_2$), as explained above, produce a change in the coupled rotor impedance as rotor 84 rotates. This changing impedance affects the stator current, $I_{STATOR}$, in the stator winding. Particularly, each different cross-sectional rotor bar has a different respective rotor bar resistance, $R_{ROTOR\ BAR}$, thus creating a different rotor current, $I_{ROTOR}$, and stator current, $I_{STATOR}$. Therefore, as rotor 84 rotates, the rotating rotor bars 114 cause the stator current, or load current, to change. The changing load current has a ripple component caused by the difference between the rotating electrical field and the rotating variable load current. The ripple component is related to a slip frequency of rotor 84. Particularly, the waveform indicates a double slip frequency, DSF, from which the slip frequency may be identified.

The identified slip frequency may be used to control the motor torque and monitor the target speed. Particularly, the motor torque, i.e. the rotor shaft rotating speed, may be determined by subtracting the slip frequency from the supplied frequency, $E_{STATOR}$. Such computation may be performed, for example, with computer 36 of CT system 10 (FIG. 3). Applied frequency, $E_{STATOR}$, and the determined slip frequency may be utilized in a closed loop system so that the operator may control the target rotation speed. For example, applied frequency, $E_{STATOR}$, may be continuously compared to determined slip frequency to ascertain the target speed. Target acceleration and braking, therefore, may be performed based on the ascertained target speed. Specifically, applied frequency, $E_{STATOR}$, may be modified to generate an appropriate slip frequency, and thus an acceptable target speed.

Figure 9:
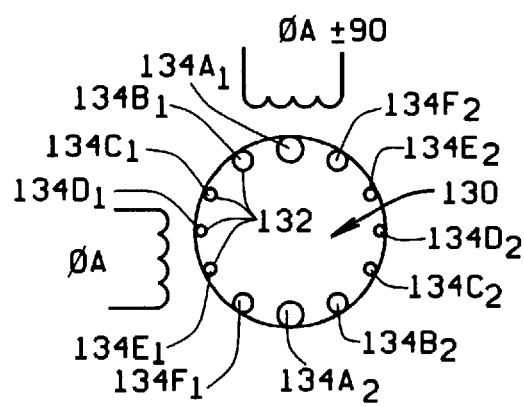
FIG. 9 is a schematic diagram of a two phase motor in accordance with one embodiment of the present invention.
Figure 10:
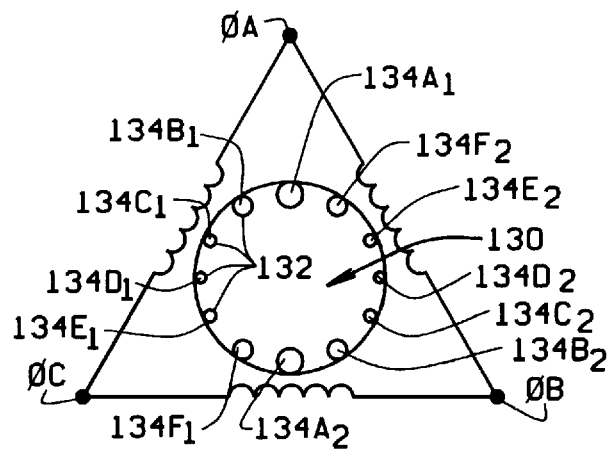
FIG. 10 is a schematic diagram of a three phase delta connected stator in accordance with another embodiment of the present invention.
Figure 11:
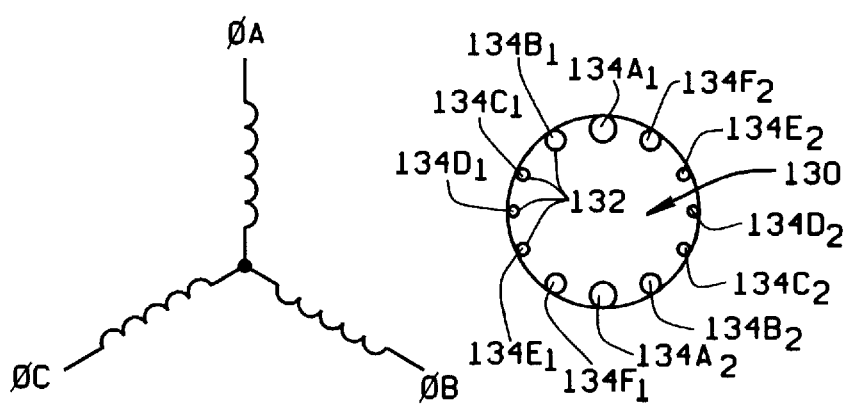
FIG. 11 is a schematic diagram of a three phase star connected stator in accordance with one embodiment of the present invention.

The above-described rotor may be utilized in conjunction with several different types of motors and stators. For example, and referring to FIG. 9, a schematic diagram of a rotor 130 with a two phase motor is shown. Rotor 130 includes a plurality of rotor bars 132 arranged in rotor bar pairs ($134A_1$, $134A_2$), ($134B_1$, $134B_2$), ($134C_1$, $134C_2$), ($134D_1$, $134D_2$), ($134E_1$, $134E_2$), and ($134F_1$, $134F_2$). Alternatively, FIG. 10 is a schematic diagram of rotor 130 with a three phase delta connected stator. In addition, FIG. 11 is a schematic diagram of rotor 130 with a three phase star connected stator.

The above-described induction motors, including rotor bars having different cross-sectional area, permit precise measurement of target slip frequency. By monitoring the target slip frequency, the target speed can be precisely controlled.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the induction motor described herein is a squirrel cage induction motor. However, other induction motors may be used. Likewise, while the rotor described herein rotates relative to a substantially stationary stator, the rotor may be coupled to a stator so that the rotor remains substantially stationary and the stator rotates relative to the rotor. Furthermore, the rotor bars described herein are substantially cylindrical. However, the rotor bars may have other shapes, such as generally triangular or generally square. In addition, while the rotor described herein includes a plurality of laminations, the rotor may constructed of a one-piece stock. Similarly, the rotor may have any number of rotor bars, not just the number depicted in the Figures. Accordingly, the spirit and scope of the invention are to be limited only by the terms of the appended claims.

What is claimed is:

1. An electric motor configured to be connected to a voltage having a selected frequency for driving a target of an x-ray source, said motor comprising:

a stator comprising a stator winding configured to be energized by the voltaae having the selected frequency and a stator core, said stator core comprising a first end, a second end, a substantially cylindrical stator bore extending from said first end to said second end, and a plurality of stator winding slots at a periphery of said stator bore; and a substantially cylindrical rotor coaxially mounted within said stator bore, said rotor comprising a first end, a second end, and a plurality of rotor bars extending from said first end to said second end at an outer periphery of said rotor, each said rotor bar having a first end and a second end, at least one of said rotor bars having a cross-sectional area different from a cross-sectional area of another one of said rotor bars, a rotor bar having a smallest cross-sectional area located approximately about 90 degrees away from a rotor bar having a largest cross-sectional area, said rotor further comprising a first shorting ring and a second shorting ring, said first shorting ring electrically connecting said rotor bar first ends, said second shorting ring electrically connecting said rotor bar second ends.

2. An electric motor in accordance with claim 1 wherein said rotor further comprises a first rotor bar pair, said first rotor bar pair comprising two rotor bars having a first substantially similar cross-sectional area, said rotor bars of said first rotor bar pair positioned 180 degrees apart at said rotor outer periphery.

3. An electric motor in accordance with claim 2 further comprising a second rotor bar pair, said second rotor bar pair comprising two rotor bars having a second substantially similar cross-sectional area different from said first substantially similar cross-sectional area, said rotor bars of said second rotor bar pair positioned 180 degrees apart at said rotor outer periphery.

4. An electric motor in accordance with claim 3 wherein said first rotor bar pair and said second rotor bar pair are oriented so that a first plane containing said rotor bars of said first rotor bar pair is substantially perpendicular to a second plane containing said rotor bars of said second rotor bar pair.

5. An electric motor in accordance with claim 4 wherein said rotor further comprises a third rotor bar pair comprising two rotor bars having a third substantially similar cross-sectional area, said rotor bars of said third rotor bar pair positioned 180 degrees apart at said rotor outer periphery.

6. An electric motor in accordance with claim 5 wherein said first substantially similar cross-sectional area is larger than said third substantially similar cross-sectional area, said first substantially similar cross-sectional area is larger than said second substantially similar cross-sectional area, and said third substantially similar cross-sectional area is larger than said second substantially similar cross-sectional area.

7. An electric motor in accordance with claim 1 wherein said rotor bars are generally cylindrical.

8. An electric motor in accordance with claim 1 wherein said rotor further comprises a rotor shaft bore extending from said rotor first end to said rotor second end, said rotor shaft bore configured to coaxially receive therein a rotor shaft, said rotor shaft coupled to an anode of an x-ray source.

9. A method for determining slip frequency in an induction motor, the induction motor having a stator and a rotor, the stator including a stator bore and stator winding, the rotor coaxially mounted within the stator bore and having first and second ends, the rotor further including a plurality of rotor bars extending from the rotor first end to the rotor second end at a periphery of the rotor, at least one of the rotor bars having a cross-sectional area different from a cross-sectional area of another one of the rotor bars, a rotor bar having a smallest cross-sectional area located approximately about 90 degrees away from a rotor bar having a largest cross-sectional area, said method comprising:

energizing the stator winding with a having a selected frequency; and identifying a slip frequency.

10. A method in accordance with claim 9 further comprising the step of producing a changing rotor impedance, and the step of identifying the slip frequency comprises utilizing said changing rotor impedance.

11. A rotor configured to be utilized in an electric motor having a stator including a stator winding configured to be energized by a voltage having a selected frequency and a stator core, said rotor comprising:

a rotor core having a first end, a second end, a rotor shaft bore extending from said first end to said second end, and a plurality of rotor bar openings at a periphery of said rotor core, said rotor bar openings extending from said first end to said second end, said rotor core configured to be coaxially mounted within the stator core;

a plurality of rotor bars located within said rotor bar openings, each said rotor bar having a first end and a second end, said rotor bars extending from said first end of said rotor core to said second end of said rotor core, at least one of said rotor bars having a cross-sectional area different from a cross-sectional area of another one of said rotor bars, a rotor bar having a smallest cross-sectional area located approximately about 90 degrees away from a rotor bar having a largest cross-sectional area; and a first shorting ring and a second shorting ring, said first shorting ring electrically connecting respective first ends of said rotor bars, said second shorting ring electrically connecting respective second ends of said rotor bars.

12. A rotor in accordance with claim 11 further comprising a first rotor bar pair, said first rotor bar pair comprising two rotor bars having a first substantially similar cross-sectional area, said rotor bars of said first rotor bar pair positioned 180 degrees apart at said rotor core outer periphery.

13. A rotor in accordance with claim 12 further comprising a second rotor bar pair, said second rotor bar pair comprising two rotor bars having a second substantially similar cross-sectional area different from said first substantially similar cross-sectional area, said rotor bars of said second rotor bar pair positioned 180 degrees apart at said rotor core outer periphery.

14. A rotor in accordance with claim 13 wherein said first rotor bar pair and said second rotor bar pair are oriented so that a first plane containing said rotor bars of said first rotor bar pair is substantially perpendicular to a second plane containing said rotor bars of said second rotor bar pair.

15. A rotor in accordance with claim 14 wherein said rotor further comprises a third rotor bar pair comprising two rotor bars having a third substantially similar cross-sectional area, said rotor bars of said third rotor bar pair positioned 180 degrees apart at said rotor core outer periphery.

16. A rotor in accordance with claim 15 wherein said first substantially similar cross-sectional area is larger than said third substantially similar cross-sectional area, said first substantially similar cross-sectional area is larger than said second substantially similar cross-sectional area, and said third substantially similar cross-sectional area is larger than said second substantially similar cross-sectional area.

17. A rotor in accordance with claim 11 wherein said rotor bars are generally cylindrical.

18. A rotor in accordance with claim 11 wherein said rotor core further comprises a rotor shaft bore extending from said rotor first end to said rotor second end, said rotor shaft bore configured to coaxially receive therein a rotor shaft, said rotor shaft coupled to an anode of an x-ray source.

19. A rotor in accordance with claim 11 wherein said rotor core comprises a plurality of rotor laminations.

\* \* \* \* \*